United States Patent [19]
Horikawa

[11] Patent Number: 4,803,409
[45] Date of Patent: Feb. 7, 1989

[54] ACCELERATION SIGNAL CORRECTED MOTOR SPEED CONTROL SYSTEM

[75] Inventor: Kazuo Horikawa, Kanagawa, Japan

[73] Assignee: Fuji Photo Film Co. Ltd., Minamiashigara, Japan

[21] Appl. No.: 55,886

[22] Filed: Jun. 1, 1987

Related U.S. Application Data

[63] Continuation of Ser. No. 811,320, Dec. 19, 1985, abandoned, which is a continuation of Ser. No. 578,646, Feb. 9, 1984, abandoned.

[30] Foreign Application Priority Data

Feb. 10, 1983 [JP] Japan ................................. 58-19838

[51] Int. Cl.$^4$ ............................................. H02P 5/00
[52] U.S. Cl. ..................................... 318/310; 318/397
[58] Field of Search ................... 73/505, 507, 510–514; 318/309–310, 311, 332, 388, 393, 396–398, 331, 312–315, 326, 327, 329

[56] References Cited

U.S. PATENT DOCUMENTS

| | | | |
|---|---|---|---|
| 4,095,547 | 6/1978 | Benington . | |
| 4,097,789 | 6/1978 | Doemen | 318/331 X |
| 4,119,897 | 10/1978 | Skoog | 318/331 |
| 4,239,968 | 12/1980 | Kotera et al. | 250/327 |
| 4,274,053 | 6/1981 | Ito et al. | 324/174 |
| 4,319,188 | 3/1982 | Ito et al. | 324/173 |
| 4,387,428 | 6/1983 | Ishida et al. | 364/414 |
| 4,410,799 | 10/1983 | Okamoto | 250/327 |

FOREIGN PATENT DOCUMENTS 57-19376 11/1982 Japan .

OTHER PUBLICATIONS

Traister, R. J., All About Electric and Hybrid Cars, Tab Books, Blue Ridge Summit, Pa., 1982, pp. 55–58.

Primary Examiner—William M. Shoop, Jr.
Assistant Examiner—David Martin
Attorney, Agent, or Firm—Fleit, Jacobson, Cohn & Price

[57] ABSTRACT

The speed of a motor supported on a supporting base the position of which is changed during operation of the motor is controlled by use of a detector for detecting the degree of angular acceleration of the motor supporting base in a plane normal to the shaft of the motor. The angular acceleration detector is supported on the motor supporting base, and the signal detected thereby is used as one of the speed control command signals.

8 Claims, 1 Drawing Sheet

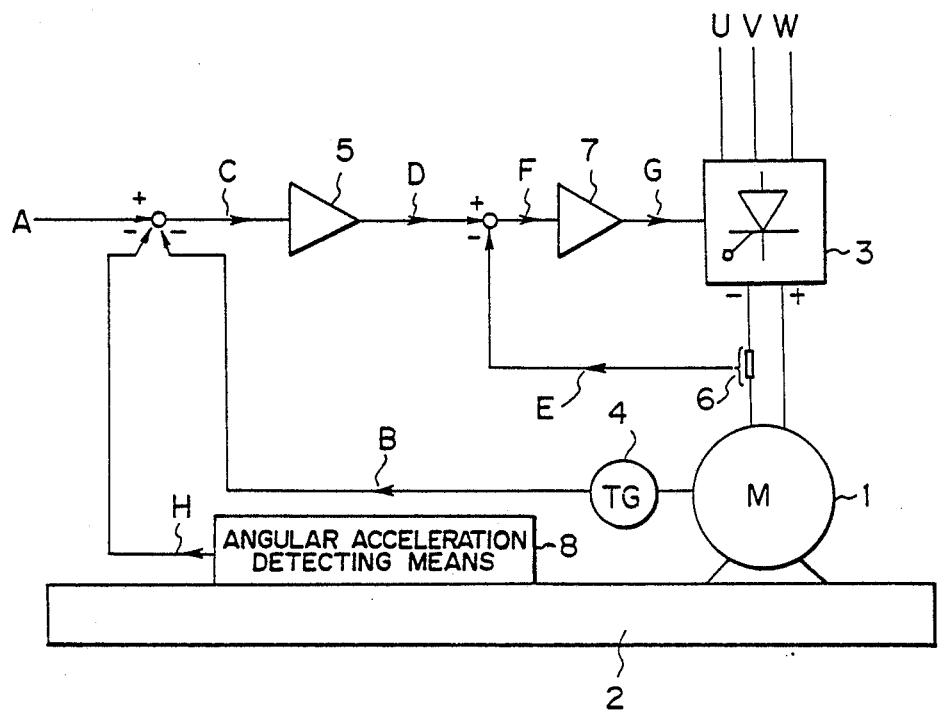

ACCELERATION SIGNAL CORRECTED MOTOR SPEED CONTROL SYSTEM

This is a continuation of application Ser. No. 811,320, filed Dec. 19, 1985, now abandoned, which is a continuation of Ser. No. 578,646, filed Feb. 9, 1984, now abandoned.

BACKGROUND OF THE INVENTION

1. Field of the Invention

This invention relates to an improvement in a method of controlling the speed of a motor. This invention particularly relates to an improvement in a method of controlling the speed of a low-speed motor mounted on a supporting base the position of which is changed by rotation, swinging or the like when the motor is operating.

2. Description of the Prior Art

In portable audio apparatuses such as cassette decks and radiation image recording and read-out systems using a stimulable phosphor as described, for example, in Japanese Patent Application No. 57(1982)-193767, which are placed and used in a vehicle, the motors used therefor are mounted on supporting bases the positions of which are changed during operation of the motor installations. In the motors of this type, the stator is subject to the same movement as that of the supporting base, and the rotor is required to undergo a desired movement with respect to the stator.

In the aforesaid motors, when a change in the position of the supporting base causes a change in angular velocity in a plane normal to the shaft of the motor, namely when angular acceleration arises with respect to the shaft of the motor, the change in the position of the supporting base causes the rotation speed of the motor to change. This occurs because the rotor has inertia and tends to maintain the previous movement including that of the supporting base carrying the motor thereon.

In order to control the speed of the motor the rotor of which is subject to a movement relative to the stator, it is necessary to regulate speed control so as to compensate for the movement of the rotor relative to the stator. The compensation for the movement of the rotor relative to the stator is of course not necessary when the movement is at a constant angular velocity, but is necessary only when such movement involves angular acceleration of the motor shaft. Actually, the aforesaid compensation is found to be significant only when the degree of angular acceleration generated with respect to the shaft of the motor by the aforesaid relative movement is significantly large with respect to the rotation speed of the rotor of the motor.

Although there have been such motors wherein the stator undergoes movement which is likely to disturb the rotation speed of the rotor, in general, the degree of angular acceleration of the stator relative to the rotor was very small with respect to the rotation speed of the rotor so that there were few cases where compensation for the movement of the supporting base relative to the rotor was required.

However, in the aforesaid radiation image recording and read-out systems using a stimulable phosphor, or the like, the rotation speed of the rotor of the motor used in the systems is very low and, in general, ranges from about 0.4 rpm to 2 rpm. On the other hand, the degree of angular acceleration produce by the movement of the supporting base on the shaft of the motor is nearly 200 mrad/sec$^2$. Therefore, the effect of the movement of the supporting base on the rotation speed of the rotor is not negligible. In the speed control of the motor used in the aforesaid new applications, it is desirable to eliminate the adverse effect of a change in the position of the stator supporting base on the rotation speed of the rotor.

The primary object of the present invention is to provide a method of controlling the speed of a motor supported on a supporting base the position of which is changed during operation of the motor, the method eliminating the adverse effect of the movement of the supporting base on the rotation speed of the rotor.

Another object of the present invention is to provide a method of controlling the speed of a motor supported on a supporting base the position of which is changed during operation of the motor, the method being very suitable for the speed control of a low-speed motor supported on such a supporting base.

SUMMARY OF THE INVENTION

The aforesaid objects are accomplished by a method of controlling the speed of a motor supported on a supporting base the position of which is changed by rotation, swinging or the like during operation of the motor, wherein the improvement comprises correctively modifying one of the speed control command signals by means of a signal detected by an angular acceleration detecting means already well known in the art, per se, such as a rotary encoder, a resolver, an Inductosyn or a tachometer generator, which is arranged on said supporting base for limiting detection of angular acceleration of angular displacement of the shaft of said motor, in directions perpendicular thereto i.e. in a plane normal to the shaft of the motor found to be significant as aforementioned.

In the method of the present invention, the degree of angular acceleration of the supporting base is calculated by differentiating the output signal of the angular acceleration detecting means such as a rotary encoder, a resolver, an Inductosyn or a tachometer generator, positioned on the motor supporting base so that the axis of the angular acceleration detecting means is in the same direction as that of the shaft of the motor. A negative sign is given to the angular acceleration signal thus calculated, and the signal is fed, as one of the speed control command signals, to the speed control system of the motor. For example, when a motor exhibiting a rated torque of 40 kg-cm, a rated rotation speed of 1 rpm and a rotor inertia of 20 kg-cm-sec$^2$ was supported on a supporting base which was swung so as to exert angular acceleration of 200 mrad/sec$^2$ on the shaft of the motor, a speed disturbance within the range of ±0.1 rpm inevitably arose in the conventional technique. However, when the method in accordance with the present invention was used in this case, no disturbance in the rotation speed was observed and it was found that the method in accordance with the present invention very accurately eliminated the adverse effect of the movement of the supporting base on the rotation speed of the rotor. The method of the present invention is very suitable for controlling the speed of a low-speed motor mounted on a supporting base the position of which is changed by rotation, swinging or the like during operation of the motor.

BRIEF DESCRIPTION OF THE DRAWING

The single FIGURE of the drawing is a block diagram showing an embodiment of the method of controlling the motor speed in accordance with the present invention.

DESCRIPTION OF THE PREFERRED EMBODIMENT

The present invention will hereinbelow be described in further detail with reference to the accompanying drawing.

By way of example, the drawing shows the case where a DC motor 1 fed with a direct current of a desired level obtained by a gate turn-off thyristor 3 and speed-controlled through the negative feedback of a speed signal detected by a tachometer generator 4 is mounted on a supporting base 2 the position of which is changed during operation of the motor 1. The gate turn-off thyristor 3 receives an alternating current, rectifies it and feeds a direct current to the motor 1. A speed command signal A is compared with a speed signal B detected by the tachometer generator 4 driven by the motor 1. A speed error signal C indicating the amount of deviation between the speed command signal A and the speed signal B is then amplified by an amplifying circuit 5 to generate a current command signal D. The current command signal D is then compared with a current signal E detected by a shunt circuit 6. A current error signal F indicating the amount of deviation between the current command signal D and the current signal E is amplified by an amplifying circuit 7 to generate a speed control signal G, which is then fed to the gate turn-off thyristor 3. An angular acceleration detecting means 8 (as disclosed for example in U.S. Pat. No. 3,295,377 comprising a rotary encoder, a resolver, or the like), and a differentiating circuit is supported on the supporting base 2 for detecting the degree of angular acceleration of the supporting base 2 in a plane normal to directionally limited to displacement of the motor shaft the rotational axis of the shaft of the motor 1. Thus directionally limited angular velocity values when detected by the rotary encoder, the resolver or the like are differentiated to obtain an angular acceleration signal H. The sign of the angular acceleration signal H is reversed (e.g. a positive angular acceleration signal is converted to a negative acceleration signal) and correctively added to the speed command signal A for comparison of the corrected speed command signal with the speed signal B to obtain the speed error signal C. The speed error signal C is processed as described above to control the speed of the motor 1.

In this embodiment, since the speed command signal A for controlling the speed of the motor 1 is corrected on the basis of the angular acceleration signal H indicating the degree of angular acceleration of the supporting base 2, it is possible to eliminate the adverse effect of a change in the position of the supporting base 2 on the rotation speed of the motor 1.

When a motor exhibiting a rated torque of 40 kg-cm, a rated rotation speed of 1 rpm and a rotor inertia of 20 kg-cm-sec$^2$ was secured to the supporting base 2 and the speed thereof was controlled by the method shown in the drawing, no disturbance in the rotation speed of the motor was observed, and the technical effect of the present invention was verified. When the speed control was conducted according to the conventional technique, a speed disturbance within the range of about ±0.1 rpm was detected.

I claim:

1. In combination with means for controlling the speed of a motor supported on a supporting base the position of which is changed during operation, said motor having a shaft,
    input command means for inputting a speed signal representing a desired speed of the motor;
    sensing means for generating an actual speed signal representing the actual speed of said motor;
    detecting means responsive to angular acceleration of said supporting base in directions perpendicular to the motor shaft, caused by changes in position of said supporting base for correcting said speed signal in accordance with an angular acceleration signal representing said detected angular acceleration of said supporting base;
    comparison means comparing said speed signal corrected by the angular acceleration signal with said actual speed signal for outputting a speed error signal representing differences between the signals compared; and
    signal transmitting means operatively connecting the comparison means to the speed controlling means for substantially eliminating adverse disturbances of the rotational speed of the motor caused by the changes in the position of the supporting base.

2. The apparatus of claim 1 wherein said signal transmitting means comprises:
    a first amplifying means connected to said comparison means, amplifying said speed error signal and for outputting a current command signal representing said amplified speed error signal; and
    a shunt circuit, connected between said controlling means and said motor, for detecting current used to power said motor.

3. The apparatus of claim 2 wherein said signal transmitting means further comprises:
    second comparison means, receiving and comparing said detected current from the motor and said current command signal for outputting a current error signal representing a deviation between said current and the command signal.

4. The apparatus of claim 1 wherein said sensing means is a tachometer generator.

5. A method of controlling the speed of a motor supported on a supporting base, said motor having a shaft undergoing rotation at a speed affected by angular acceleration of the supporting base, comprising the steps of:
    inputting a speed command signal representing a desired speed of the motor;
    sensing the actual speed of said motor to produce an actual speed signal;
    detecting the angular acceleration of said supporting base, caused by changes in position of said supporting base, in a plane normal to the shaft of said motor;
    providing an angular acceleration signal representing said detected angular acceleration of said supporting base to correct the speed command signal;
    comparing said speed command signal corrected by said angular acceleration signal with said actual speed signal;
    outputting a speed error signal representing differences between the signals compared; and controlling the speed of said motor in accordance with said speed error signal to maintain said motor speed constant notwithstanding angular changes in the position of the supporting base.

6. The method of claim 5 wherein said step of controlling further comprises the steps of:
   amplifying said speed error signal;
   rectifying a current representing power supply to said motor; and
   detecting said rectifying current used to power said motor.

7. The method of claim 6 wherein said step of controlling further comprises the steps of:
   comparing said detected rectifying current and said current command signal;
   outputting a current error signal representing a deviation between said compared current and signal;
   amplifying said current error signal; and
   outputting a speed control signal representing said amplify current error signal.

8. In combination with a system for controlling rotational speed of a motor about a rotational axis thereof, said motor being mounted on a supporting base subject to changes in position, including the steps of:
   detecting angular acceleration of the motor displaced by said changes in position of the supporting base;
   producing input commands representing desired speed of the motor;
   sensing actual speed of the motor about said rotational axis;
   comparing said input commands and the actual speed sensed to produce an error signal corresponding to deviations between said desired speed and the sensed actual speed; and
   regulating the speed of the motor in accordance with said error signal to reduce said deviations;
   the improvement residing in the elimination of adverse effects of said angular acceleration on the regulated speed of the motor, including the further steps of:
   limiting said detection of the angular acceleration to said displacement of the motor relative to a plane normal to the rotational axis thereof; and
   correcting the input commands being compared in accordance with said limited detection of the angular acceleration to correctively modify the error signal utilized to regulate the speed of the motor.

* * * * *